(No Model.) 5 Sheets—Sheet 1.
C. ANDERSON.
CLOSED CONDUIT ELECTRIC RAILWAY.
No. 555,487. Patented Mar. 3, 1896.
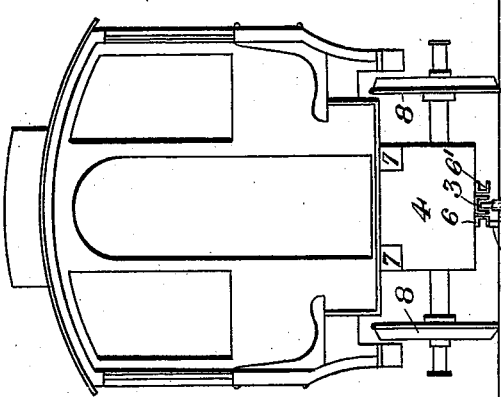
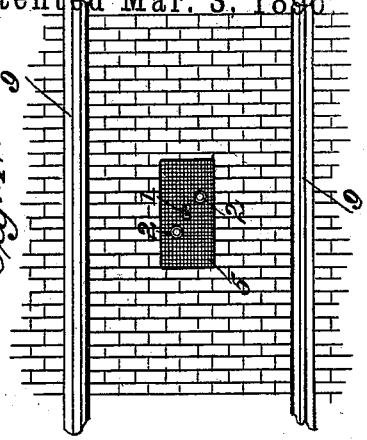
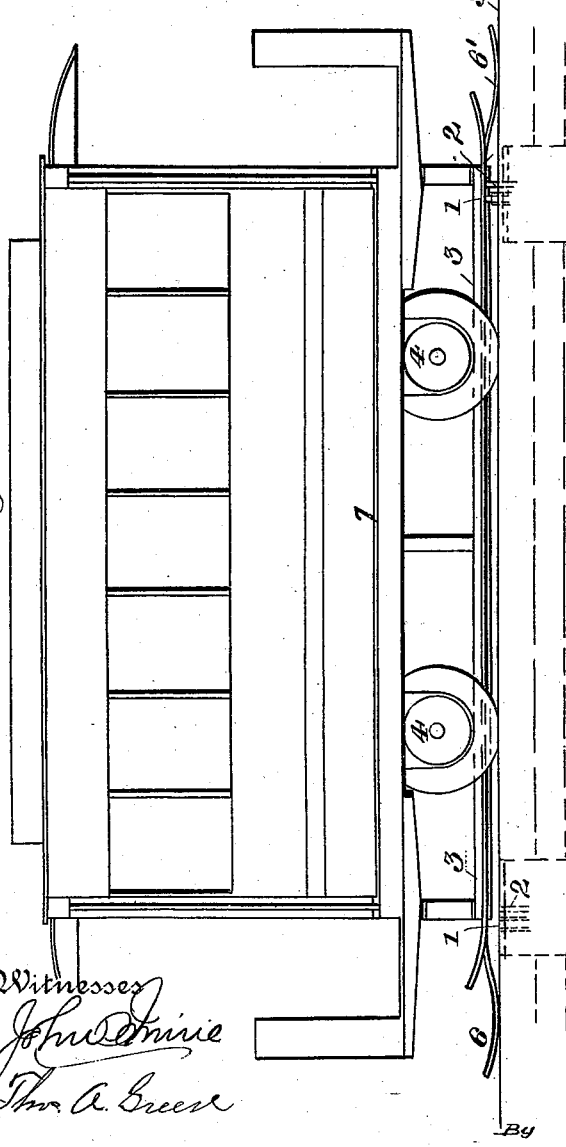
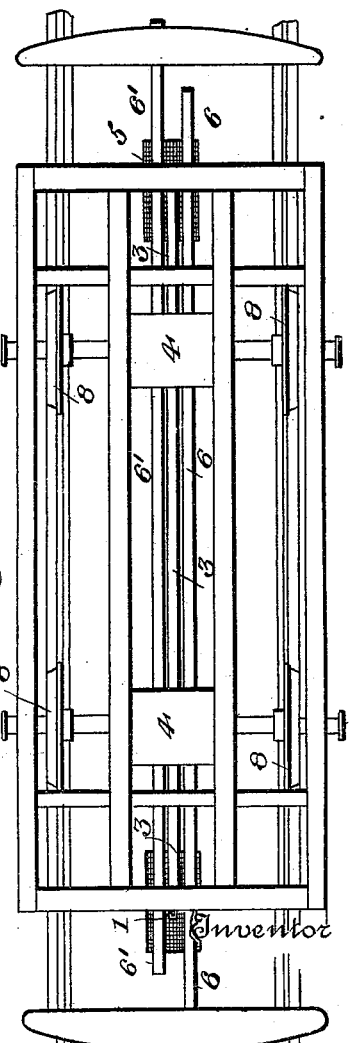
Witnesses
Inventor
Chris Anderson
By James L. Norris
his Attorney (No Model.)
C. ANDERSON.
CLOSED CONDUIT ELECTRIC RAILWAY.
No. 555,487. Patented Mar. 3, 1896.
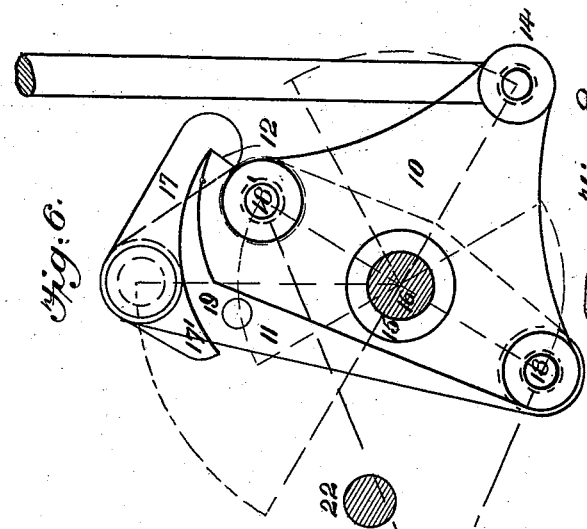
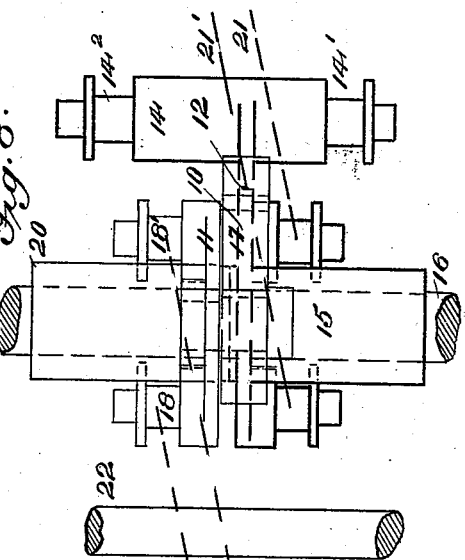
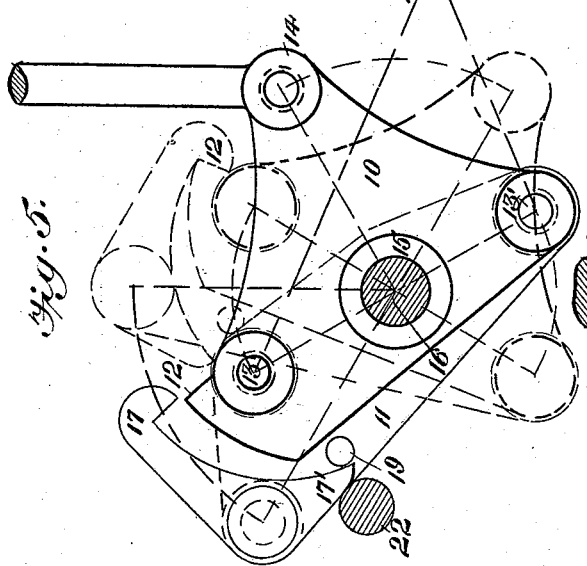
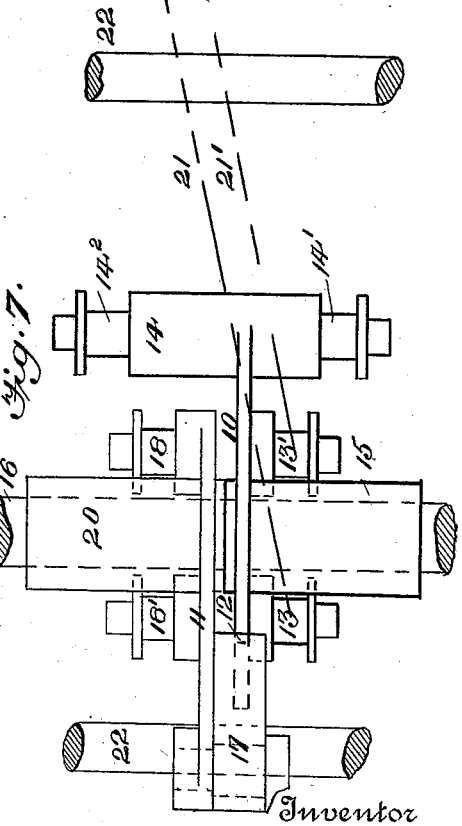
Witnesses
Inventor
Chris Anderson.

(No Model.) 5 Sheets—Sheet 3.
C. ANDERSON.
CLOSED CONDUIT ELECTRIC RAILWAY.
No. 555,487. Patented Mar. 3, 1896.
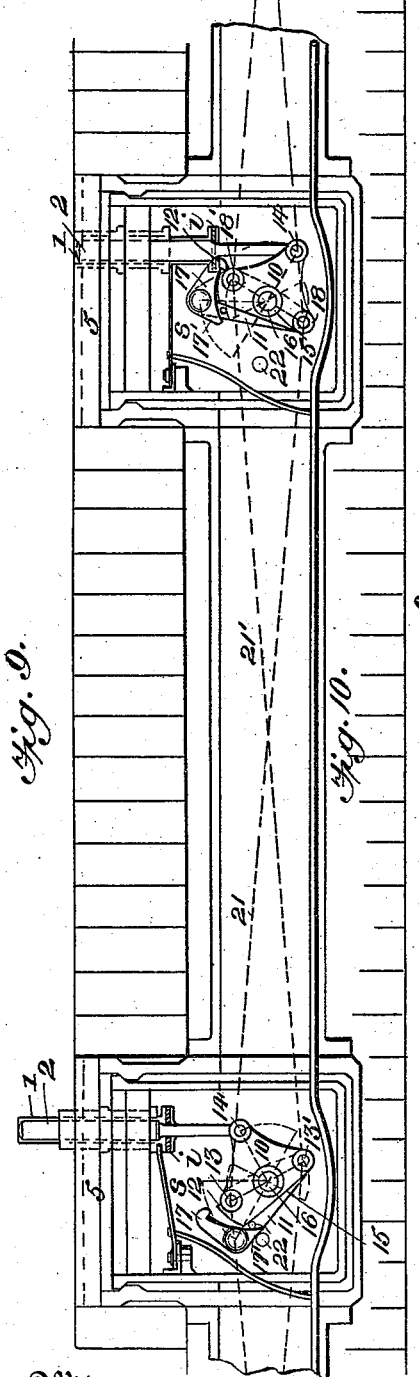
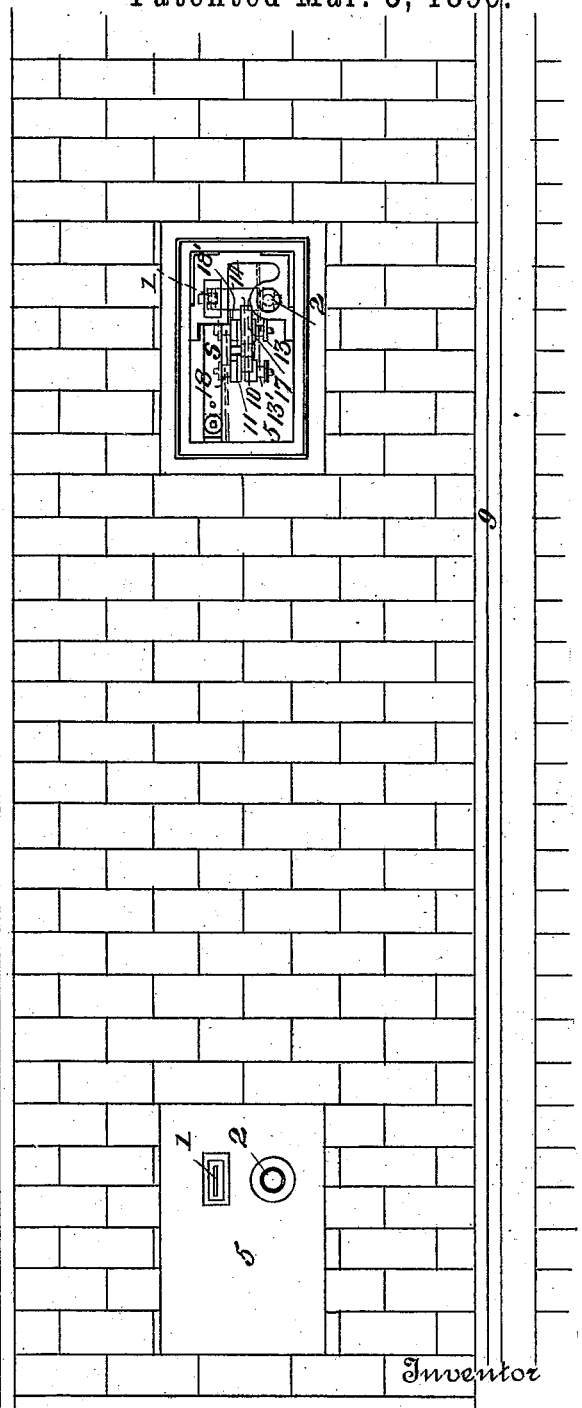
Witnesses
Inventor
Chris Anderson,
By James L. Norris,
his Attorney (No Model.)  5 Sheets—Sheet 4.
C. ANDERSON.
CLOSED CONDUIT ELECTRIC RAILWAY.
No. 555,487.  Patented Mar. 3, 1896.
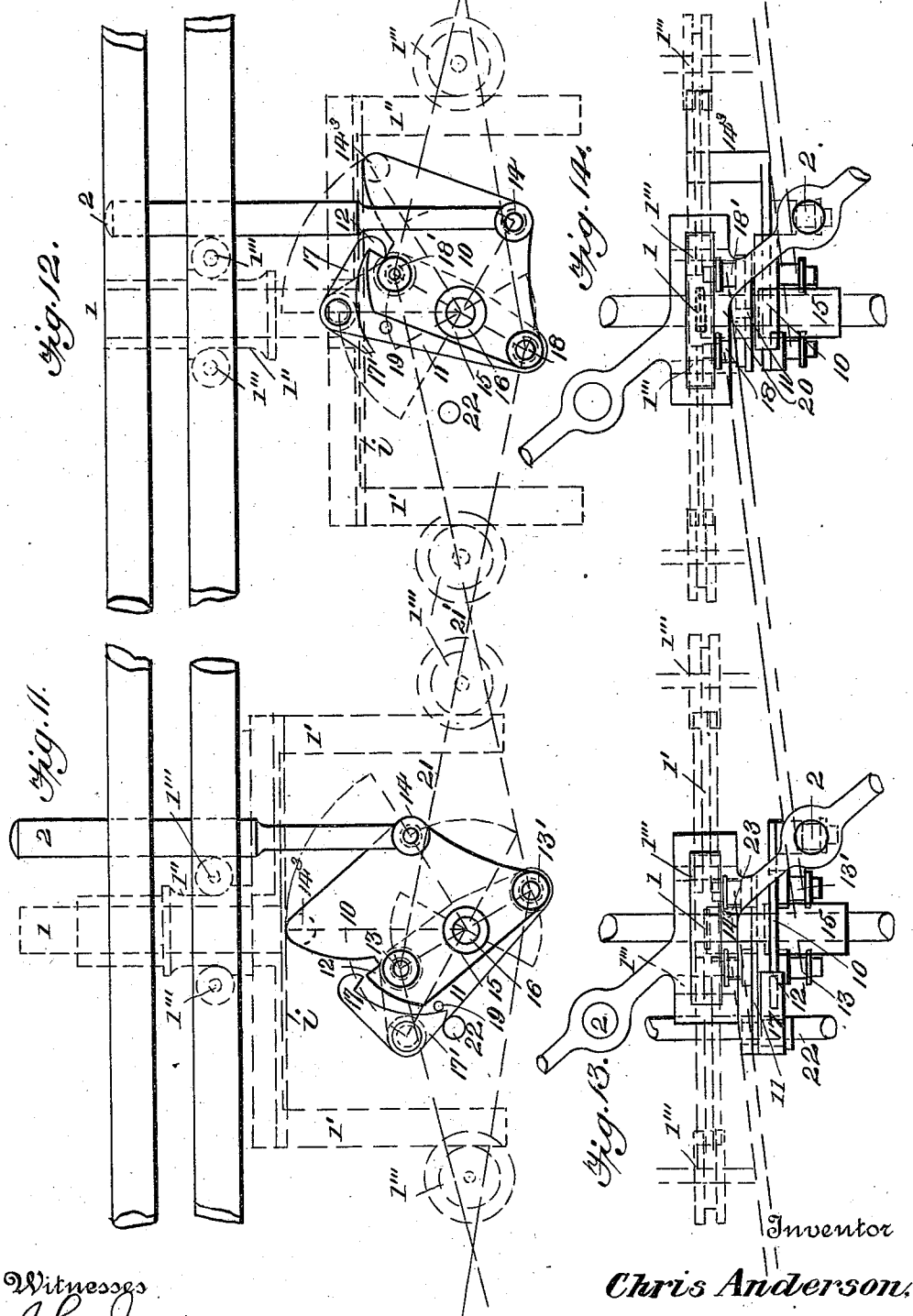
Witnesses
John Bowell
Thos. A. Green
Inventor
Chris Anderson.
By James L. Norris.
his Attorney

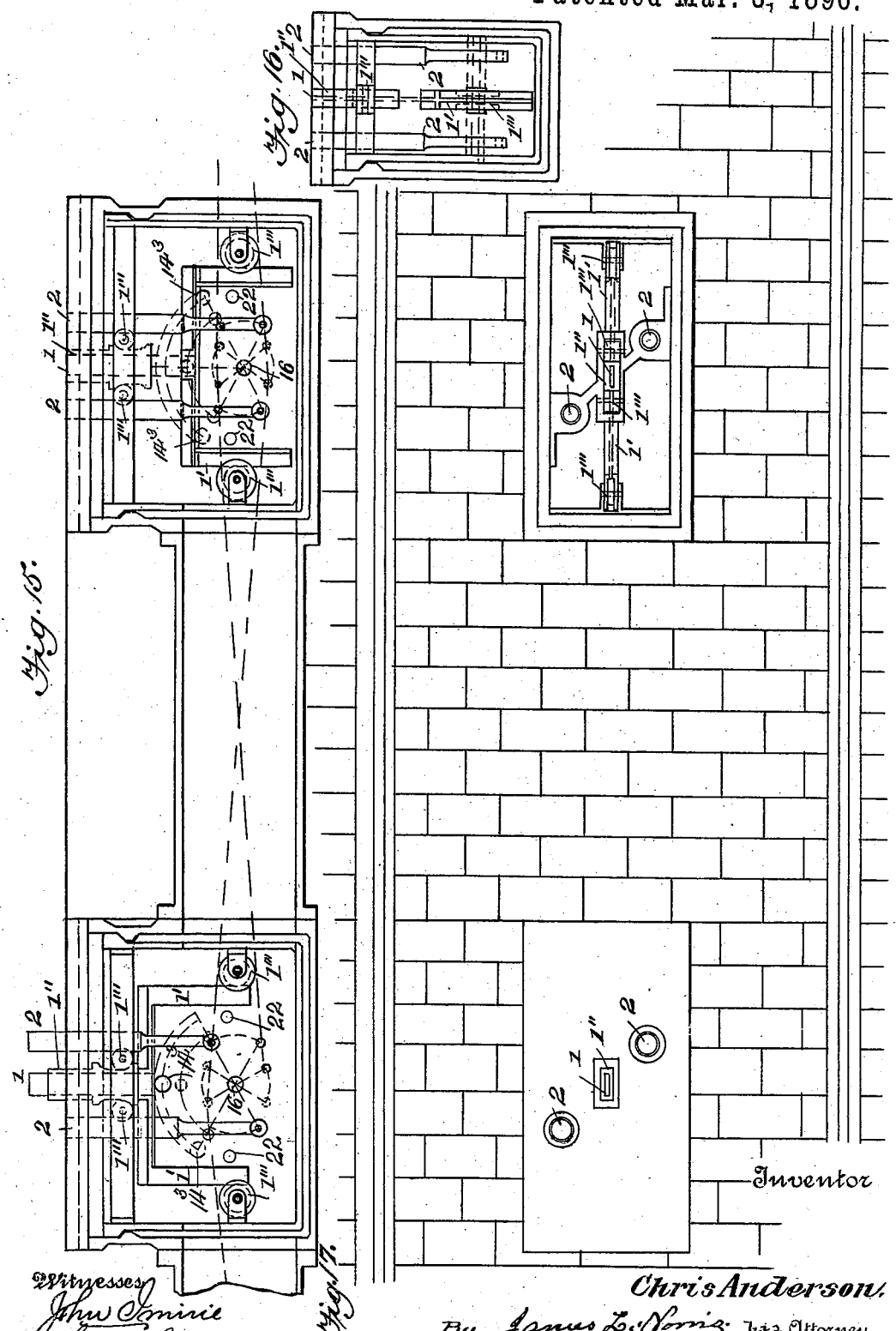

UNITED STATES PATENT OFFICE.

CHRIS ANDERSON, OF LEEDS, ENGLAND.

CLOSED-CONDUIT ELECTRIC RAILWAY.

SPECIFICATION forming part of Letters Patent No. 555,487, dated March 3, 1896.

Application filed March 1, 1894. Serial No. 502,015. (No model.) Patented in England July 31, 1893, No. 14,647.

*To all whom it may concern:*

Be it known that I, CHRIS ANDERSON, civil engineer, a subject of the Queen of Great Britain, residing at Lane House, Jack Lane Hunslet, in the city of Leeds, in the county of York, England, have invented certain new and useful Improvements in Apparatus for Working Electric Tramways by Means of Underground Cables, (for which I have obtained Letters Patent in Great Britain, No. 14,647, bearing date the 31st day of July, 1893,) of which the following is a specification.

My invention consists of a novel method and means of making electrical connection between the motors of tram-cars and other vehicles propelled by electricity (hereinafter referred to for brevity as "cars") on tramways and underground conductors of electricity transmitting the necessary currents herein referred to as "cable."

My invention has for its special object to provide a means for the aforesaid purpose which is not subject or liable to the inconveniences, difficulties, and uncertainties of working which are incidental to the use of a continuous slit in the roadway, as now ordinarily used.

In carrying out my invention I dispense with the slit altogether or else place a cover over it, and by the latter method my invention can be adapted to existing tramways. I use a cable laid below the roadway and between the rails, as in the present systems of electric tramway, and I use the tramway-rails for the purpose of completing the electric circuit, as now also practiced. I inclose the cable in a conduit formed under the roadway, as hereinafter mentioned, and used also for the mechanism hereinafter described. This conduit may consist of a continuous box or trough of iron or concrete or other material with a continuous cover without any slit or visible opening, (except where perforated, as and for the purposes hereinafter mentioned,) or may consist of a series of boxes or cases sunk in the roadway at suitable intervals with underground (but no surface) connection between them. By preference I use the latter method, and for convenience and brevity I shall adapt my description to that method and shall use the word "boxes" without the addition of "cases." These boxes are placed at suitable intervals in and flush with the roadway, two at least being within the length of one car, for the reason hereinafter appearing.

In the cover of each box I make one or more perforations. By preference I use two perforations in each box-cover on a line upon which a car is to be propelled one way only and three where the car is required to run both ways; but one perforation will suffice to run a car one way only. Whether one or more perforations be used, one of them, if more than one, or the one, if only one, must be lined with some insulating material, or else instead of a fixed lining there must be a rising tube of some insulating material.

Through each insulated perforation successively I make contact between the cable below and the car above. This is done by means of short metal pins or pegs, (hereinafter for distinction called "contact-pegs,") which, being connected to mechanism such as hereinafter described, or any other suitable mechanism placed in the boxes below the roadway, become projected in succession above the covers of the boxes by the action of the car as it runs along, and thereby come in contact at the same time with the cable below and with a slider, bridge-brush, or other conducting medium above placed underneath the car to be propelled, through which slider, bridge-brush, or other conducting medium the electric current is conveyed from the cable to the car-motor and thence to the wheels and rails or return-wire by any suitable connections in like manner as now commonly practiced under other systems. By preference I use a bridge-brush, but whatever may be the form of conducting medium employed it must be of sufficient length to be always in contact with one contact-peg in advance before contact with the one toward the rear is lost, or at least must always be in contact with one contact-peg, so as thereby to maintain constant electrical connection. The bridge-brush may be arranged so as to rub against one or both sides of the contact-pegs or on the top of them only. Underneath the car and attached thereto I provide one or more ramps or treading-pieces, by preference one for each way the car may be required to run, and not forming part of any slider or other conducting medium beneath the car, and the mechanism within the underground conduit is so constructed that as the car passes along and depresses one contact-peg it causes the contact-peg next in advance to rise to form contact, to be again in turn depressed as the car passes over it and sinks it flush with the cover of the box. The contact-pegs are so constructed as when down to be out of contact with the cable and thus prevent danger to the public from accidental contact with the complete electric circuit.

As before stated, I use two or more perforations in each box-cover, one of which is insulated and used for the contact-peg, as hereinbefore described. The other perforation, where two only are used, or the other perforations, where three are used, are for what are hereinafter called "mechanical pegs," used as and for the purpose hereinafter more particularly described, having no electrical properties and constructed to withstand the wear and tear of the road-service and prevent the damage which would result to the contact-pegs if they were to be used for the double purpose of mechanical and contact pegs. I provide three perforations in each box-cover, and two mechanical pegs, one for each direction when the car is required to run both ways on the same line, the third perforation being for the contact-peg which is common to both the mechanical pegs.

My method of operating the mechanical and therewith the contact-pegs and otherwise carrying out my invention is as follows: In each box and mounted upon the same shaft side by side are two levers, one being double-ended and the other a triple lever, the upper edge of which latter carries a tooth. The double lever carries at its upper end a pawl. From the triple lever in one box two connections are made by wires from two corners of the triple lever to the two ends of the double lever in the next box forward. The third corner of the triple lever carries a mechanical peg, and the connections between the triple lever in one box and the double lever in the next box forward are so made that when the mechanical peg in one box is raised it pulls the lower end of the double lever in the next box, and so throws the upper end forward when the pawl falls into contact with the tooth on the upper edge of the triple lever. Then when the mechanical peg in the first box is depressed by the ramp on the car the upper end of the double lever in the next box is pulled backward, and therewith the triple lever in that box is also pulled over, thereby causing the mechanical peg attached thereto to rise, and throwing forward the double lever and pawl in the box farther on, and so on continuously.

Where one contact-peg is used with one mechanical peg, then and in that case the contact-peg may be mounted on the side of the triple lever on the same stud as the mechanical peg; but when one contact-peg is to be used in common with two mechanical pegs then I mount the peg on a rising frame, hereinafter called the "contact-peg" frame, and lift the frame by means of a pin on the side of each of the two triple levers in the same box. The completion of the downward movement of any mechanical peg throws out of gear by means of a stop-pin coming in contact with the pawl-tail in the box next forward the purchase or hold by which the mechanical peg in such box next forward has been caused to lift, so that when such last-mentioned mechanical peg is made to descend it does not reverse the motion on the one in the rear by which it has been lifted, but acts only on the next peg forward, leaving all pegs in the rear sunk in the roadway and out of electrical connection with the cable beneath.

The electrical connection between the contact-pegs successively and the underground cable is made only in the latter part of the rising motion of the contact-pegs, and consequently such electrical connection is broken in the early part of the sinking motion of such pegs, and all electrical connection between the car and the cable ceases before the ramp carried by the car, which depresses the mechanical peg, has left the same.

To bring the automatic apparatus into action it is necessary when a car is first started from the station or terminus to raise the first peg into contact by some suitable additional appliance, or by hand. The same may also be necessary in case of accident to any peg in the course of a journey, or where it is desired to back the car. There are many ways of doing this. The action required is first to raise a peg outside the length of a car and again depress it so as to raise the one under the car. At the station it may be done by means of a mechanical peg being prolonged to a suitable height above the floor-level and provided with a cross-head or other handle for the convenience of the operator in first pulling and then pushing. On a journey a different method must necessarily be used, but the nature of the operation is the same.

I make no claim to any particular method and I do not confine myself to any particular method of effecting the operation. If the place of operation be at some distance from a car, so that the first peg raised is outside the length of the car, then the peg so raised or any number of pegs consecutively raised may be pushed down by the foot until finally a peg is raised under the car.

To meet the case of a car getting off the track the cars will carry a suitable length of spare cable capable of attachment to any contact-peg and so establish connection between the car and the cable below the roadway.

I do not confine myself to any particular method of establishing electrical connection between the cable and the contact-pegs. Such connection may be established by means of wires or other metallic connection between such pegs and switches, (one switch to each peg,) and such switches may be actuated and put into connection with the cable by means of suitable pulling or pushing attachments to the triple levers. Another method is to connect the pegs, in manner aforesaid, to one surface of a rubbing contact affixed to but insulated from some part of the moving mechanism, the other surface of the rubbing contact being connected with the cable; and I make my contact-pegs so that the parts to which the cable attachments are made are insulated from every other part of the mechanism hereinbefore described. Where a contact-peg is used with one mechanical peg and attached thereto, as hereinbefore mentioned, such insulation may be effected in the attachments or may be effected by making the peg in two parts, the upper insulated from the lower; but where a contact-peg frame is used then such insulation may be effected either in the peg itself or in the method of attaching the peg to the frame or by means of insulated linings in the frame or by means of insulated bearings. I lay no claim to any particular method of effecting such insulation.

In order to render the foregoing explanation more clear I refer to the accompanying sheets of drawings, wherein—

Figure 1 is a vertical longitudinal section of a car and the conduit. Fig. 2 is a vertical cross-section of the same. Fig. 3 is a plan view, the body of the car being removed. Fig. 4 is a plan view of the track and one of the boxes containing the contact-making mechanism. Fig. 5 is a diagrammatic side elevation of the mechanism for raising and lowering the contact-pegs. Fig. 6 is a similar view showing the same parts in another position. Figs. 7 and 8 are plan views, respectively, of the parts shown in Figs. 5 and 6. Fig. 9 is a side elevation of the parts shown in Figs. 5 and 6, illustrating the same in operative position in their containing-boxes and showing the conduit between the boxes. Fig. 10 is a plan view of a roadway equipped with my apparatus, showing one box with its cover on and another with the cover off so as to exhibit the mechanism below. Figs. 11 and 12 are side elevations of the essential parts of my apparatus as adapted for running both ways. Figs. 13 and 14 are plan views thereof. Fig. 15 is a vertical longitudinal section of the boxes and conduit equipped with the apparatus shown in Figs. 11 and 12. Fig. 16 is a cross-section taken through one of the boxes. Fig. 17 is a plan view of the roadway provided with apparatus for running both ways on the same line of rails, the cover of one of the boxes being removed.

Referring to Figs. 1, 2, 3 and 4, the numeral 1 indicates the electrical pegs and 2 the mechanical pegs.

3 indicates the bridge-contact and connection arranged beneath the car, and 4 the motor of any usual or desired construction.

The boxes for containing the operating mechanism are designated by the numeral 5, and 6 indicates the ramps for depressing the mechanical pegs, one ramp being provided for each direction in which the car is run.

7 indicates the car-body, 8 the wheels, and 9 the railway-rails.

Referring to Figs. 5, 6, 7 and 8, the numerals 10 and 11 indicate two rocking levers, the triple lever 10 (shown in heavy lines) being provided with a tooth 12. In said figures are also shown two wire or rod connecting-pins 13 13', a boss 14 carrying a pin 14' for connecting the mechanical peg, a pin $14^2$ for connecting the contact-peg, and a boss-bearing 15 which is mounted on a bearing-shaft 16. The lever 11 (shown by fine lines) is provided with a pawl 17 for engaging the tooth 12, two wire or rod connecting-pins 18 18', a stop-pin 19 for the pawl-tail 17', and a bearing-boss 20 which is mounted also on the shaft 16. The various motions of the centers are shown by dotted lines and arcs, and the engaged and disengaged positions of the two rocking levers by the pawl and tooth are shown by thick and fine dotted lines corresponding with the full lines.

Fig. 5 shows the disengaged position of the rocking levers in full lines, and which may be termed a "single set," the mechanical and contact pegs being in the raised and electrically-connected position, though the contact-peg is not shown, while Fig. 6 shows the engaged position of similar levers in the next box forward ready for lifting the pegs in such next box forward by the downward motion of the first mechanical peg-lever 10, being connected in the first box to lever 11, in the second box by rods or wires 21 21', which are crossed from top pin 13 on lever 10 to bottom pin 18 on lever 11 in the next box forward, and from bottom pin 13' on lever 10 to top pin 18' on lever 11, thus producing in oscillating a reverse motion on the two wire-connected levers in the different boxes.

Let it be assumed that a car is traveling over the tramway illustrated in the drawings in a direction from left to right, and that the mechanical peg in the box immediately preceding the box illustrated in Fig. 5 has been pushed down by the car passing thereover, thus raising the mechanical peg shown in Fig. 5. Then when the car passes over the mechanical peg shown in said Fig. 5, it will swing or oscillate the lever 10 forward and thus draw back the rod or wire 21', and said rod or wire being attached at its forward end to the pin 18' on the upper part of the lever 11 (shown in Fig. 6) said lever 11 will be oscillated backward to the position shown in Fig. 6 by dotted lines, and as it swings back the pawl 17 being in engagement with the upper end of lever 10 draws said lever back with it, raising the mechanical peg connected to said lever and swinging forward the lever in the succeeding box corresponding to the lever 11, so that its pawl will engage the upper end of the lever beside it and corresponding to the lever 10, and when the car passes over and depresses the mechanical peg shown in Fig. 6 the levers in the next or succeeding box will be oscillated backward and raise the mechanical peg in said box. Thus it is apparent that the rising-peg motion in the first box throws the lever 11 in the next box forward, so that the pawl 17 engages the tooth 12 of the lever 10 in the next box forward, which latter lever is in the position of mechanical peg down or disconnected, and it is equally obvious that the descending motion of the mechanical peg and connections in the first box will raise the mechanical peg and connections in the next box forward, and that by the latter part of the lifting motion of the lever 11 the tail of pawl 17' will strike against the stop-bar 22, and the pawl 17 will be disengaged from the tooth 12 and will stand in the position shown by full lines in Fig. 5, leaving the lever 10 in the next box forward free to act upon the levers in the box in advance of that without disturbing the lever 10 in the first box. These motions are continuously repeated in advance as the vehicle runs along the road. In like manner the pegs are raised and depressed by each succeeding car passing over the road, it being understood that in starting from either terminal of the road the first peg is to be elevated by any suitable means provided for the purpose, after which the succeeding pegs will be operated by the car in the manner above described.

Figs. 11 to 17 illustrate a double set of levers 10 and 11, before described, as they are applied for working a contact-peg, which is common to two sets of levers or two mechanical pegs, as used for running both ways on the same road. Two sets of levers 10 and 11 are required, one set for running each way, and their individual and collective action is the same as in the single set except that a projection or pin $14^3$ on lever 10 in performing its functions lifts the contact-peg frame 1' 1' and its connection, a similar pin on the second set performing the same office for running in the opposite direction. An insulating-piece for the electric peg is shown by 1'' and insulating runner guides or rollers by 1''' 1'''.

The electrical connection between the cable and the contact-peg is made and broken by means of a switch either forming part of the said peg or by a separate switch worked from lever 10, the time of the connection being arranged by the proportions of the movement of the said switch and its contact.

The switch is indicated in the various views by the reference-letter S, and in all cases the contact-peg is insulated from the rest of the mechanical parts and cases or bearings by the interposition of suitable insulating material, as at $i$.

Having now particularly described and ascertained the nature of my invention and in what manner the same is to be performed, I declare that what I claim is—

1. In apparatus for operating electric railways from an underground supply-cable, the combination with a series of vertically-movable contact-pegs adapted to complete the circuit between the car-motor and the said electric supply-cable, and peg-actuating mechanism arranged in a series of boxes together with said contact-pegs, of mechanical and positive means for elevating a peg in one box by the depression of a peg in the box next behind, through suitable connections from box to box, substantially as described.

2. In apparatus for operating electric railways from an underground electric supply-cable, the combination with a series of vertically-movable contact-pegs and a series of vertically-movable mechanical pegs, and a series of boxes arranged at intervals for containing said pegs, of lever mechanism arranged in said boxes and connected with the pegs therein and with the lever mechanism in adjacent boxes, the said contact-pegs being each adapted to complete the circuit between the car-motor and the electric supply-cable and the said mechanical pegs being arranged to be depressed by a passing car, which depression of the pegs in one box will cause the elevation of the pegs in the next forward box through the connections of the lever mechanisms in the series of boxes, substantially as described.

3. In an electric railway, the combination with an underground conductor, of the series of rocking levers 10 and 11 arranged in pairs and connected together as shown, the lever 11 being provided with a tooth 12 and the lever 10 with a pawl 17 adapted to engage said tooth, pegs carried by said levers, and adapted to be projected in the path of the car, and contacts operated by said levers to make and break the circuit between the conductor and the car, substantially as described.

4. In an electric railway, the combination with an underground conductor, of vertically-movable contact-pegs adapted to complete the circuit between the conductor and a car, a ramp 6 carried underneath the car, and mechanism operated by said ramp for raising and depressing said pegs to make and break the circuit, substantially as described.

Dated this 17th day of February, 1894.

CHRIS ANDERSON.

Witnesses:
THOS. DALTON,
HERBERT S. P. LOUDON.